(12) United States Patent
Stoyanovsky et al.

(10) Patent No.: US 10,885,082 B2
(45) Date of Patent: Jan. 5, 2021

(54) IMPLICIT RELATION INDUCTION VIA PURPOSEFUL OVERFITTING OF A WORD EMBEDDING MODEL ON A SUBSET OF A DOCUMENT CORPUS

(71) Applicant: International Business Machines Corporation, Armonk, NY (US)

(72) Inventors: Anastas Stoyanovsky, Pittsburgh, PA (US); Roxana Gheorghiu, Pittsburgh, PA (US); Robert L. Yates, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/928,310

(22) Filed: Mar. 22, 2018

(65) Prior Publication Data

US 2019/0294695 A1  Sep. 26, 2019

(51) Int. Cl.
  *G06N 20/00* (2019.01)
  *G06F 16/33* (2019.01)
  *G06F 16/93* (2019.01)
  *G06F 16/951* (2019.01)

(52) U.S. Cl.
  CPC ......... *G06F 16/3347* (2019.01); *G06F 16/93* (2019.01); *G06F 16/951* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 8,700,403 B2 | 4/2014 | Weng et al. | |
| 10,360,507 B2* | 7/2019 | Aravamudan | G16B 50/00 |
| 2016/0155067 A1 | 6/2016 | Dubnov et al. | |
| 2016/0247061 A1 | 8/2016 | Trask et al. | |

OTHER PUBLICATIONS

Olivias et al. 2008. Conceptual Soft-Computing based Web Search: FIS-CRM, FISS Metasearcher and GUMSe Architecture. Springer-Verlag Berlin Heidelberg. pp. 107-134.*

(Continued)

*Primary Examiner* — Tuankhanh D Phan
(74) *Attorney, Agent, or Firm* — Law Office of Jim Boice (57) ABSTRACT

A method overfits a word vector generating process to identify implicit relationships between two or more terms in a corpus. A server identifies instances of multiple user-generated pairs of terms in an original corpus of documents, in which the terms are labeled but a relationship between two or more of the corpus terms are not identified. The server then extracts sentences, from the original corpus of documents, that contain one or more of the multiple user-generated pairs of terms, and combines the sentences into a training corpus, which is used to purposely overfit a word embedding model. This word embedding model leads to a vector that is used to identify other terms that have a same type of relationship as that found in the multiple user-generated pairs of terms, such that search corpus of documents can be searched for similar terms that trained the word embedding model.

19 Claims, 5 Drawing Sheets

(56) References Cited

OTHER PUBLICATIONS

P. Mell et al., "The NIST Definition of Cloud Computing", National Institute of Standards and Technology, Information Technology Laboratory, Sep. 2011, pp. 1-7.

Dhingra, B. et al.; "A Comparative Study of Word Embeddings for Reading Comprehension"; https://arxiv:1703.00993v1/pdf; pp. 1-6, Mar. 2017.

Ganea, O-E. et al.; "Deep Joint Entity Disambiguation with Local Neural Attention"; https://arxiv:1704.04920v3/pdf; pp. 1-12, Jul. 2017.

Anonymous; "Automatic Categorization of IT Infrastructure Service Management Data Using Natural Language Processing and Machine Learning"; http://ip.com/IPCOM/000245200D; Feb. 18, 2016.

Anonymous; "Machine Learning Algorithms for Smart Meter Diagnostics"; http://ip.com/IPCOM/000242462D; Jul. 16, 2015.

Anonymous; "System and Method for Application-Oriented Hybrid Word Segmentation with Supervised and Unsupervised Data"; http://ip.com/IPCOM/000240823D; Mar. 5, 2015.

Drozd, A., et al., "Word Embeddings, Analogies, and Machine Learning: Beyond King—Man+Woman=Queen", Proceedings of COLING 2016, the 26th International Conference on Computational Linguistics: Technical Papers, pp. 3519-3530, Osaka, Japan, Dec. 11-17, 2016.

Surdeanu, M., et al., "Stanford's Distantly-Supervised Slot-Filling System", In Proceedings of the Fourth Text Analysis Conference (TAC 2011), pp. 1-6, 2011.

Angeli, G., et al., "Stanford's Distantly Supervised Slot Filling Systems for KBP 2014", In Text Analysis Conference (TACKBP), pp. 1-10, 2015.

Diaz, F., et al., "Query Expansion with Locally-Trained Word Embeddings", Proceedings of the 54th Annual Meeting of the Association for Computational Linguistics, Association for Computational Linguistics, pp. 1-11, 2016.

Mikolov, T., et al., "Linguistic Regularities in Continuous Space Word Representations", Proceedings of NAACL-HLT 2013, pp. 746-751, Atlanta, Georgia, Association for Computational Linguistics, Jun. 2013.

Mikolov, T., et al., "Distributed Representations of Words and Phrases and their Compositionality", NIPS'13 Proceedings of the 26th International Conference on Neural Information Processing Systems—vol. 2, pp. 1-9, 2013.

Mikolov, T., et al., "Efficient Estimation of Word Representation in Vector Space", arXiv:1301.3781v3, pp. 1-12, 2013.

Pennington, J., et al., "GloVe: Global Vectors for Word Representation", Proceedings of the 2014 Conference on Empirical Methods in Natural Language Processing (EMNLP), pp. 1532-1543,. Oct. 25-29, 2014, Doha, Qatar.c2014 Association for Computational Linguistics.

* cited by examiner

IMPLICIT RELATION INDUCTION VIA PURPOSEFUL OVERFITTING OF A WORD EMBEDDING MODEL ON A SUBSET OF A DOCUMENT CORPUS

BACKGROUND

The present invention relates to the field of computers, and particularly to computers that manage documents. Still more particularly, the present invention relates to optimizing an efficiency of a computer system when retrieving documents.

SUMMARY

In one or more embodiments of the present invention, a method overfits a word vector generating process to identify implicit relationships between two or more terms in a corpus. A server receives multiple user-generated pairs of terms, where each of the multiple user-generated pairs of terms comprises a first term and a second term. The server identifies instances of the multiple user-generated pairs of terms as corpus terms in an original corpus of documents, where the corpus terms in the original corpus of documents are labeled with labels that describe the corpus terms without identifying a relationship between two or more of the corpus terms. The server extracts passages, from the original corpus of documents, that contain one or more of the multiple user-generated pairs of terms, and combines the passages into a training corpus. The server trains a word vector generating process using the training corpus, where the word vector generating process generates a numerical vector for each term from the training corpus. The server then determines a vector difference between a first vector for the first term and a second vector for the second term, and establishes a relationship between the first term and the second term based on the vector difference between the first vector and the second vector. The server receives a request from a client computer for a document from a search corpus having a third term that has a same relationship to a fourth term as the relationship between the first term and the second term. The server reiteratively subtracts one word vector from another word vector in the search corpus until a vector difference between two word vectors is within a predefined distance of the vector difference between the first vector and the second vector. The server then transmits, to the client computer, the document from the search corpus that contains two word vectors whose vector difference is within the predefined distance.

In one or more embodiments of the present invention, a computer program product and/or computer system overfits a word vector generating process to identify implicit relationships between two or more terms in a corpus. A server receives multiple user-generated pairs of terms, where each of the multiple user-generated pairs of terms includes a first term and a second term. The server identifies instances of the multiple user-generated pairs of terms as corpus terms in an original corpus of documents, where the corpus terms in the original corpus of documents are labeled with labels that describe the corpus terms without identifying a relationship between two or more of the corpus terms. The server then extracts sentences, from the original corpus of documents, that contain one or more of the multiple user-generated pairs of terms, and combines the sentences into a training corpus. The server uses the training corpus to train a word vector generating process that generates a numerical vector for each term from the multiple user-generated pairs of terms such that each first term A from the multiple user-generated pairs of terms is assigned a version of a first numerical vector $\vec{A}$ and each second term B from the multiple user-generated pairs of terms is assigned a version of a second numerical vector $\vec{B}$. The server retrieves a third term D from the original corpus of documents, where the third term D has a same label as the second term B, and generates, by implementing the word vector generating process, a third numerical vector $\vec{D}$ for the third term D. The server determines a search numerical vector $\vec{C'}$ based on $\vec{A}-\vec{B}+\vec{D}=\vec{C'}$, and then, based on $\vec{A}-\vec{B}=\vec{C'}-\vec{D}$, determines that $\vec{C'}$ and $\vec{D}$ have a same vector relationship as $\vec{A}$ and $\vec{B}$. In response to determining that $\vec{C'}$ and $\vec{D}$ have a same vector relationship as $\vec{A}$ and $\vec{B}$, the server determines that a fourth term C and the third term D have a same relationship as a relationship between the first term A and the second term B. The server receives a request for documents that contain terms that identify an entity that has a relationship to another term that matches the relationship between the first term A and the second term B, and then compares previously generated term vectors for terms from a search corpus of documents to $\vec{C'}$. The server identifies the previously generated term vectors that are within a predetermined vector distance of $\vec{C'}$, and identifies terms, from the search corpus, whose term vectors are within the predetermined vector distance of $\vec{C'}$. The server receives a request from a client computer for documents from the search corpus that contain terms that describe an entity that has the relationship to another term that matches the relationship between the first term A and the second term B. In response to receiving the request, the server retrieves documents from the search corpus that contain at least one term whose assigned term vector is within the predetermined vector distance of $\vec{C'}$, and then transmit, to the client computer, the documents from the search corpus that contain the at least one term whose assigned term vector is within the predetermined vector distance of $\vec{C'}$.

DETAILED DESCRIPTION

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
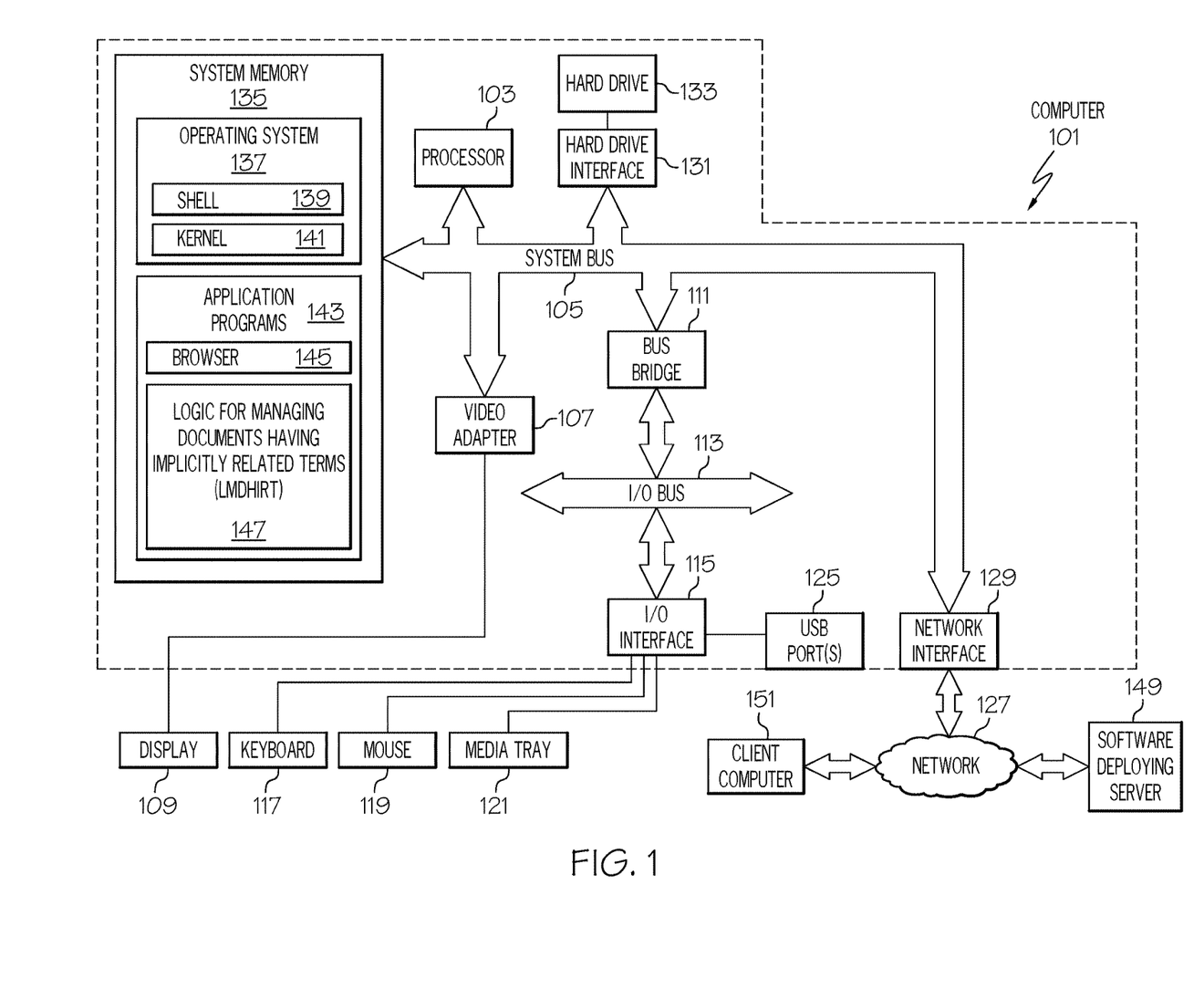
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a client computer 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Managing Documents Having Implicitly Related Terms (LMDHIRT) 147. LMDHIRT 147 includes code for implementing the processes described below, including those described in FIGS. 2-3. In one embodiment, computer 101 is able to download LMDHIRT 147 from software deploying server 149, including in an on-demand basis, wherein the code in LMDHIRT 147 is not downloaded until needed for execution. In one embodiment of the present invention, software deploying server 149 performs all of the functions associated with the present invention (including execution of LMDHIRT 147), thus freeing computer 101 from having to use its own internal computing resources to execute LMDHIRT 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The present invention addresses and solves the problem of identifying terms in documents based on their implicit, but not explicit, relationship with other terms.

A problem that is solved by the present invention is as follows. Assume that, given a document corpus and small number of examples (e.g. ten) of pairs of entities that each have the same relationship (e.g., "Enterprise A" and "Person A", "Enterprise B" and "Person B", etc.), a system needs to extract from the corpus other terms or pairs of terms that represent entities that have the same relationship as those entities in the small number of examples of the pairs of entities.

One way of determining the relationships between entities in the pairs of entities is to perform a web search. However, this is slow and cumbersome, since it requires crawling numerous webpages, followed by contextual interpretation of the webpages.

Merely finding terms that are synonyms does not solve the problem, since definitions do not describe relationships. That is, a "man" and a "son" have a different relationship than a "man" and a "wife", even though the definition for "man" is the same in both cases.

The present invention therefore interprets pairs of entities by identifying the actual relationship between the entities within each of the pairs, in order to identify their implicit relationship.

That is, given a document corpus and some small number (e.g., 5-10) of example entity pairs having some specific relationship (such as "Company A" and "Person A" as an example of the relation "is CEO of"—that is "Person A" is the CEO of "Company A"), the present invention 1) extracts entities from those documents, 2) extracts only sentences containing entities of the same types as the ones in the provided examples, 3) trains word embeddings on this specialized corpus, and then 4) applies a modification of the word analogy task to find more entities having the same relationship.

Word embeddings are a vector space language model in which the vector representation of a word is chosen by observing in which contexts that word occurs, and such a representation can be trained in multiple ways. That is, the vector representation can be trained using a feedforward Neural Net Language Model (NNLM) that projects an input layer to a projection layer using a shared project matrix. Alternatively, the vector representation can be trained using a Recurrent Neural Net Language Model (RNNLM) using a recurrent matrix that connects hidden neural layers using time-delayed connections. Alternatively, the vector representation can be trained using Parallel Training of Neural Networks (PTNN) in which a digital neural network synchronizes gradient updates generated by the neural networks operating in parallel. Alternatively, the vector representation can be trained using log-linear models, such as the Continuous Bag-of-Words (CBOW) model, the Continuous Skip-Gram Model (CSGM), etc. that learn continuous word vectors using a simple model, and then training NNLM on top of these distributed representations of words (based on the continuous word vectors).

In a preferred embodiment, however, the vector representations of words are produced using word2vec, which generates word embeddings (i.e., numerical vector representations of words/terms/phrases), and then determines their relationships based on the vector space/distance between the generated vector representations.

Word embeddings encode semantic information about words/terms/phrases (i.e., both the definition of the words/terms/phrases as well as their relationship with other words/terms/phrases. For example, consider the example of the relationship between the word "King" and "Man". The definition of "King" is a ruler, and the definition of "Man" is a type of person. However, word embeddings then define the relationship between "King" and "Man" as "King" is "a type of" "Man". Thus, by letting $\vec{W}$ denote the vector representation of a word W, then in such a language model $\vec{King}-\vec{Man}=\vec{Queen}-\vec{Woman}$, such that $\vec{King}-\vec{Man}+\vec{Woman}=\vec{Queen}'$, which gives a vector very close to $\vec{Queen}$.

Because word embeddings encode semantic information in this way, they perform very well on the word analogy task, which asks, "A is to B as C is to what?" However, asking this question in the first place requires that a "C" is known.

Thus, the present invention solves the problem of "given A and B, what C and D are there such that A is to B as C is to D?" In particular, the present invention solves the problem in the context of a corpus of text documents.

Given such an A and B, one approach would be to find vectors that are very close to the vector $\vec{A}$ and use those as possible values of the vector $\vec{C}$. However, there will usually be some "noise" incurred by this approach (e.g., false positive results), such that it is impossible to distinguish the signal from the noise unless one has some sort of knowledge external to the plain text being trained on.

One embodiment of the present invention uses a Natural Language Processing (NLP) that provides the ability to create annotators that can annotate plain natural text to identify entities in text (e.g., "Person A" of type "PERSON") and relationships between entities such as a country (e.g., "Person A" is "presidentOf" a country). More specifically, a Statistical Information and Relation Extraction (SIRE) subsystem, which uses contextual analysis of a passage to create labels for terms in the passage, has the ability to identify terms.

In order to solve the problem described above, in one embodiment of the present invention SIRE applies annotations to the plain text documents that are then used to train word embeddings. As such, given several example pairs of entities A and B that have some sort of relation, the present invention infers the type of A to find other entities of the same type as A, and then apply the analogy task. For example, given pairs (Alpha Inc., Adam)
(Bravo Inc., Brenda)
(Foxtrot Inc., Francis)

and so on, the left-hand entities are of type "Company" and the right-hand entities are of type "Person". Next, the present invention extracts all sentences from a corpus that contain an entity of each type and creates a new, domain-specific corpus comprised only of those sentences. It is on this domain-adapted corpus that the present invention trains word embeddings that are used for a slot filling task of identifying similar terms.

The usage of external knowledge in the form of a type system, together with synthesizing a domain-specific corpus using that type system, is what makes this approach work efficiently. Normally, training on a very small set leads to overfitting or underfitting the model to data, and is avoided as much as possible. However, the present invention purposefully overfits a model in order to train a model for one specific relation, using only a handful of examples.

Figure 2:
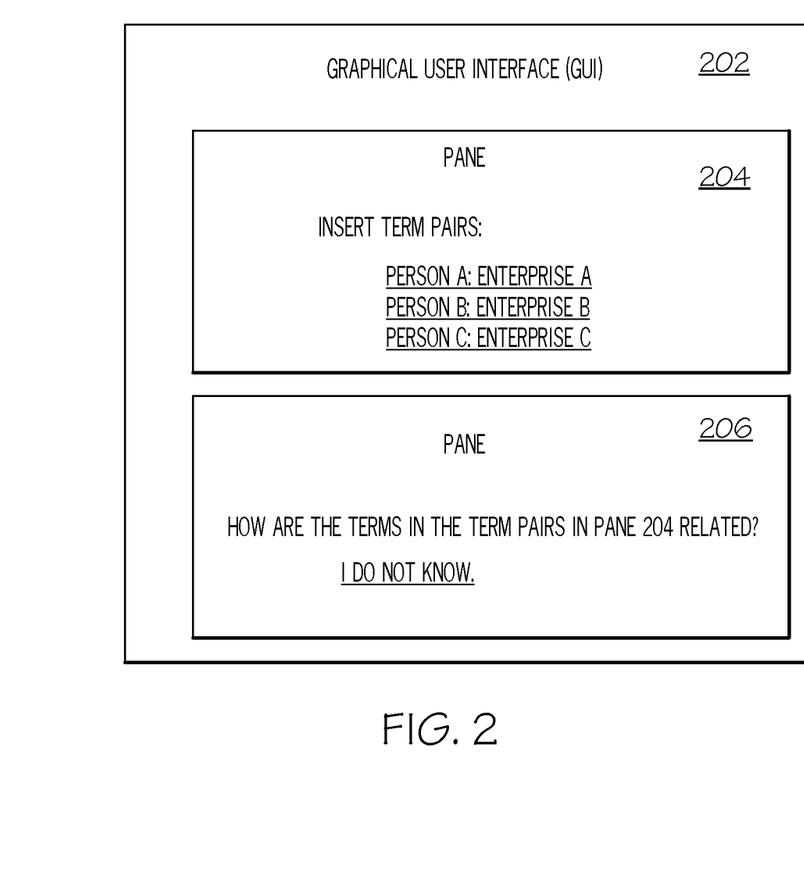
FIG. 2 illustrates an exemplary graphical user interface (GUI) that allows a user of a client computer to supply term pairs to a server.

With reference now to FIG. 2, assume that a user (e.g., of client computer 151 shown in FIG. 1) inputs several terms pairs in a pane 204 on a graphical user interface (GUI) 202. These terms are implicitly related (i.e., each of the persons A-C are chief executive officers (CEOs) of one of the respective enterprises A-C). However, this relationship is not explicit in documents, and as shown in pane 206, the user who inputted the terms does not know how they are related. Thus, the present invention determines the relationship between the terms in the term pairs using the method described herein.

Figure 3:
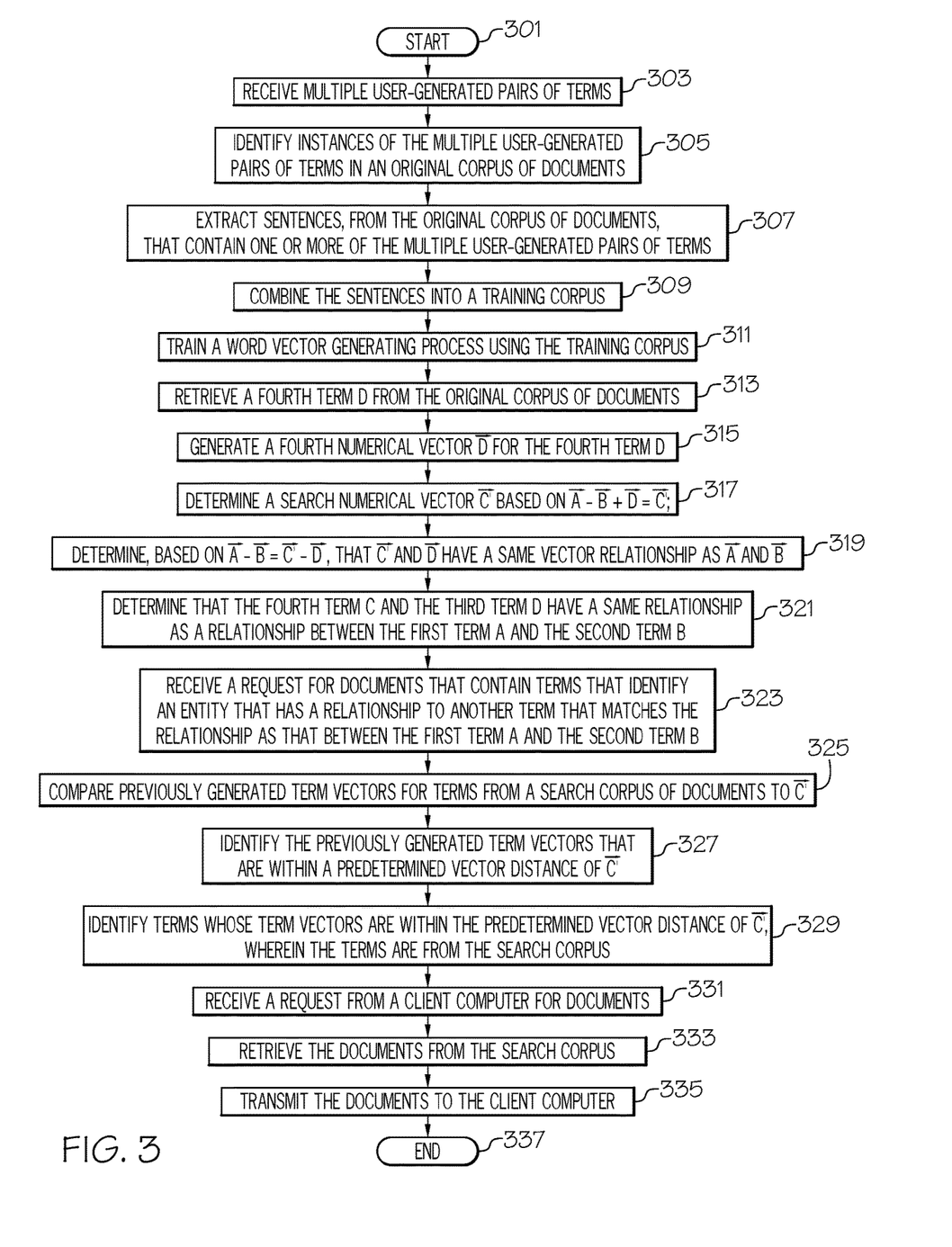
FIG. 3 is a high-level flow chart of one or more steps performed by one or more processors and/or other hardware devices in accordance with one or more embodiments of the present invention.

With reference now to FIG. 3, a high-level flow chart of exemplary steps performed by one or more processors (and/or as implemented using a computer program product and/or a computer system) to solve the problem presented above is depicted.

After initiator block 301, a server (e.g., computer 101 shown in FIG. 1) receives multiple user-generated pairs of terms (e.g., from the GUI 202 shown in FIG. 2, which is part of the client computer 151 shown in FIG. 1), as described in block 303. As depicted in FIG. 2, each of the multiple user-generated pairs of terms includes a first term and a second term.

As described in block 305, the server identifies instances of the multiple user-generated pairs of terms as corpus terms in an original corpus of documents. This original corpus of documents may be text documents, web pages, etc. The instances of the multiple user-generated pairs of terms can be identified by a standard word search process, web crawler, etc. Regardless of where the terms are found, however, they will each be labeled beforehand (i.e., during the construction and/or modification of the corpus of documents) with labels that describe the corpus terms, but do not identify a relationship between two or more of the corpus terms. That is, the term "Person A" is identified as being a person, and "Enterprise A" is identified as being a company, but there is nothing in the label(s) that show that "Person A" is the CEO of "Enterprise A".

As described in block 307, the server extracts sentences, from the original corpus of documents, that contain one or more of the multiple user-generated pairs of terms. That is, assume that the original corpus of documents is a group of text documents. Only the sentences that contain the user-generated pairs of terms are extracted.

As described in block 309, the server then combines the sentences into a training corpus. This training corpus is much smaller than the original corpus of documents. However, since every sentence in the training corpus contains at least one of the user-generated pairs of terms, it can be used to over-train the word embedding model described herein.

As described in block 311, the server then trains a word vector generating process using the training corpus. As described herein, the word vector generating process (e.g., word2vec) generates a numerical vector for each term from the user-generated pairs of terms such that each first term A from the user-generated pairs of terms is assigned a version of a first numerical vector $\vec{A}$ and each second term B from the user-generated pairs of terms is assigned a version of a second numerical vector $\vec{B}$. Although each vector $\vec{A}$ will differ slightly for each first term, and each vector $\vec{B}$ will differ slightly for each second term (since they represent different words), the vectors $\vec{A}$ and $\vec{B}$ will nonetheless have similar values, since they represent the same type of entity (e.g., a person, a company, etc.).

As described in block 313, the server retrieves a third term D from the original corpus of documents, where the third term D has a same label as the second term B. For example, if the third term D was "Enterprise Dog" and the second term was "Enterprise Bravo", they would both have the same label "company", even though they are different terms.

As described in block 315, the server then implements the word vector generating process in order to generate a third numerical vector $\vec{D}$ for the third term D.

As described in block 317, the server then determines a search numerical vector $\vec{C'}$ based on $\vec{A}-\vec{B}+\vec{D}=\vec{C'}$.

As described in block 319, the server determines, based on $\vec{A}-\vec{B}=\vec{C'}-\vec{D}$, that $\vec{C'}$ and $\vec{D}$ have a same vector relationship as $\vec{A}$ and $\vec{B}$. That is, the server subtracts $\vec{B}$ from $\vec{A}$ and $\vec{D}$ from $\vec{C'}$. If these differences are the same (or at least within a predefined range of one another), then the system determines that they represent terms that have the same relationships between the terms in the pairs.

That is and as described in block 321, in response to determining that $\vec{C'}$ and $\vec{D}$ have a same vector relationship as $\vec{A}$ and $\vec{B}$, the server determines that the fourth term C and the third term D have a same relationship as a relationship between the first term A and the second term B. This allows the system to use the term C to identify other instances of entities similar to A. That is, if A is the name of a CEO of a company, then the system has now been trained to recognize C as the name of a CEO of a company, which was not previously (expressly) known.

As described in block 323, the server receives a request for documents that contain terms that identify an entity that has a relationship to another term that matches the relationship as that between the first term A and the second term B (e.g., the request is for documents that include the name of a CEO of a company).

As described in block 325, the server compares previously generated term vectors for terms from a search corpus of documents to $\vec{C'}$.

As described in block 327, the server then identifies the previously generated term vectors that are within a predetermined vector distance of $\vec{C'}$.

As described in block 329, the server identifies terms (i.e., from the search corpus) whose term vectors are within the predetermined vector distance of $\vec{C'}$.

As described in block 331, the server receives a request from a client computer for documents from the search corpus that contain terms that describe an entity that has the relationship to another term that matches the relationship as that between the first term A and the second term B.

As described in block 333, in response to receiving the request, the server retrieves documents from the search corpus that contain at least one term whose assigned term vector is within the predetermined vector distance of $\vec{C'}$.

As described in block 335, the server then transmits, to the client computer, the documents from the search corpus that contain the at least one term whose assigned term vector is within the predetermined vector distance of $\vec{C'}$.

The flow chart ends at terminator block 337.

Thus, an overview of the flowchart shown in FIG. 3 when implemented by a server can be described as follows. While the process/method is described in numerical steps, it is understood that some or all of the steps can be performed in a different order than the order/numbering presented below.

First, a server receives multiple user-generated pairs of terms, where each of the multiple user-generated pair of terms comprises a first term and a second term. That is, the server may receive term pairs such as "Person A: Enterprise A", "Person B: Enterprise B", etc.

Next, the server identifies instances of the multiple user-generated pairs of terms as corpus terms in an original corpus of documents (i.e., they are located in a body of text). The corpus terms in the original corpus of documents are labeled with labels that describe the corpus terms without identifying a relationship between two or more of the corpus terms. That is, the documents may include a label for "Person A" as being an "engineer", and "Enterprise A" as being a corporation, but there is nothing in the labels to identify Person A as being an employee of Enterprise A or having any other relationship with Enterprise A.

Next, the server extracts passages, from the original corpus of documents, that contain one or more of the multiple user-generated pairs of terms. That is, the server finds documents that include both terms in the pair such as "Person A" and "Enterprise A".

Next, the server combines the passages into a training corpus, which is used to train a word vector generating process. This word vector generating process generates a numerical vector for each term from the training corpus. For example, the term for "Person A" may be assigned the vector $\vec{A}$ and the term for "Enterprise A" may be assigned the vector $\vec{B}$, based on their context in the passage and other information utilized by the word vector generating process (e.g., Word2Vec).

Next, the server determines a vector difference between a first vector for the first term and a second vector for the second term (i.e., $\vec{A}$ minus $\vec{B}$).

Next, the server establishes a relationship between the first term and the second term based on the vector difference between the first vector and the second vector.

Next, the server receives a request from a client computer for a document from a search corpus (which may or may not be the same document corpus as the original corpus of documents) having a third term that has a same relationship to a fourth term as the relationship between the first term and the second term. That is, the request is for documents that have terms who have the same type of relationship (e.g., employee of a company) as the terms in the training corpus. However, the labels alone are not enough to identify such terms.

Therefore, the server reiteratively subtracts one word vector from another word vector in the search corpus until a vector difference between two word vectors is within a predefined distance of the vector difference between the first vector and the second vector (i.e., a particular vector pair produces a similar/close vector when one vector is subtracted from the other vector in the vector pair).

The server then transmits, to the client computer, the document from the search corpus that contains two word vectors whose vector difference is within the predefined distance.

In an embodiment of the present invention, the search corpus is the original corpus of documents. That is, the original corpus of documents is searched for other terms that match the first/second term in the user-generated term pairs.

In an embodiment of the present invention, the search corpus is the training corpus (i.e., sentences that only contain the user-generated entity pairs).

In an embodiment of the present invention, the search corpus is a group of documents that includes news releases, sales brochures, and academic papers that are not part of the original corpus of documents. That is, the search corpus (that is being searched for the new term) is not part of the large original corpus of documents.

In an embodiment of the present invention, the search corpus is a group of documents that includes news releases, sales brochures, and academic papers that are not part of the training corpus. That is, the search corpus (that is being searched for the new term) is not part of the smaller training corpus.

In an embodiment of the present invention, assume that the first term (e.g., A) is a name of a first executive in a first company, the second term is a name of the first company (e.g., B), the third term is a name of a second executive (e.g., C) in a second company, and the fourth term is a name of the second company (e.g., D). In this embodiment, the method further includes retrieving, by the server, documents that include the name of the second executive based on a name of the second executive having been assigned a term vector that is within the predetermined vector distance of $\vec{C}$. That is, documents that contain the name of an executive (e.g., the CEO) of a company will be retrieved.

In an embodiment of the present invention, the server and the client computer are connected by a network. As such, the method reduces bandwidth consumed by the network by transmitting, from the server to the client computer, only the documents that contain the term whose assigned term vector is within the predetermined vector distance of $\vec{C}$. This leads to a technological improvement of the overall network system, since the client computer and the server are able to communicate more efficiently and faster.

In an embodiment of the present invention, assume that the server is a multi-processor computer that includes a first processor that receives the multiple user-generated pairs of terms, a second processor that extracts the sentences from the original corpus of documents that contain one or more of the multiple user-generated pairs of terms, and a third processor that trains the word vector generating process. In this embodiment, only the multiple user-generated pairs of terms are stored in a first cache in the first processor; only the sentences from the original corpus of documents that contain one or more of the multiple user-generated pairs of terms are stored in a second cache in the second processor; and only $\vec{A}$ and $\vec{B}$ for use in training the word vector generating process are stored in a third cache in the third processor. This allows the multi-processor server to go directly to dedicated caches based on what type of processor is using them and what type of data is provided by specific caches. Thus, specifying what is only stored in the first cache, the second cache, and the third cache increases the processing speed in the server.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
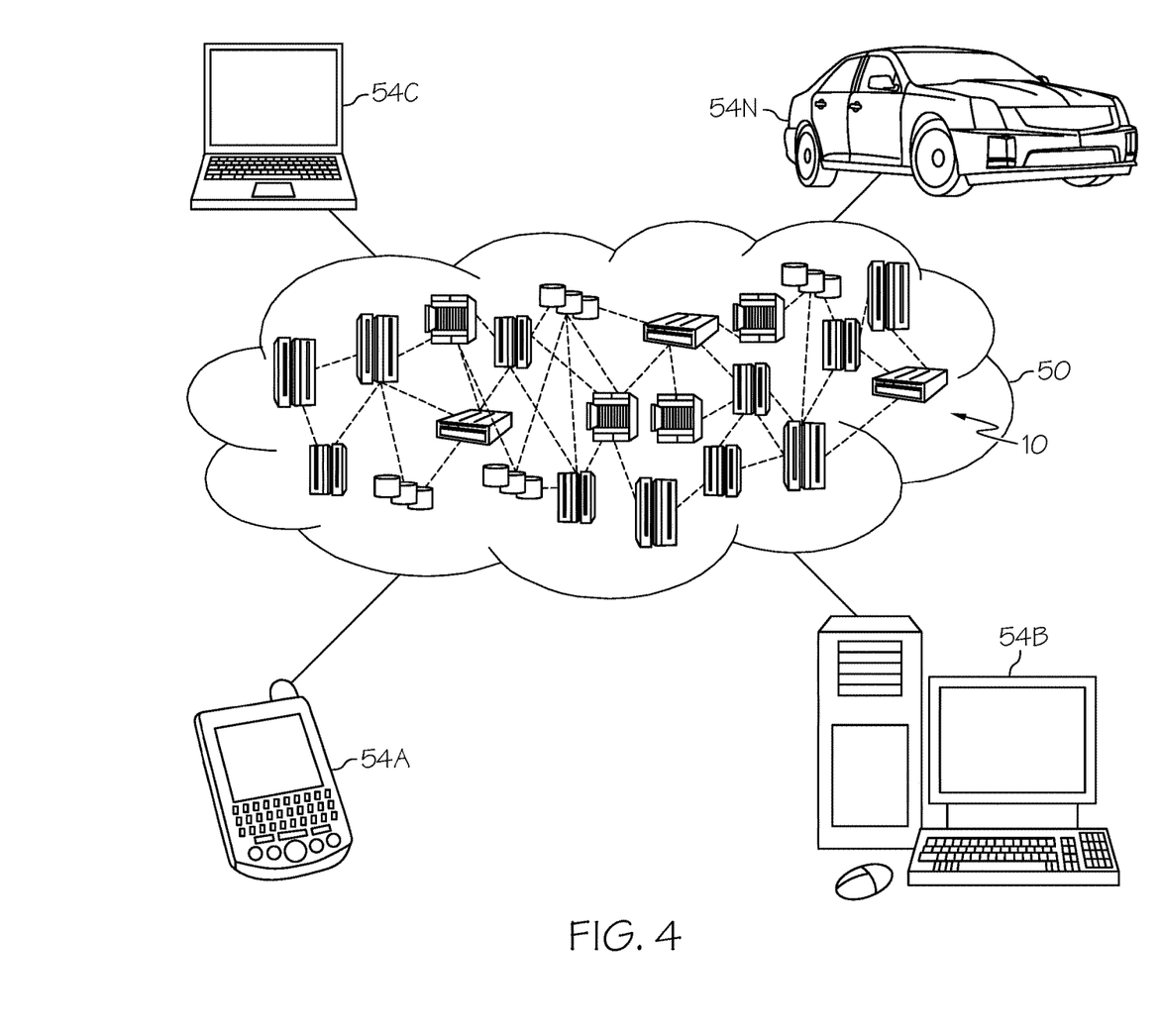
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
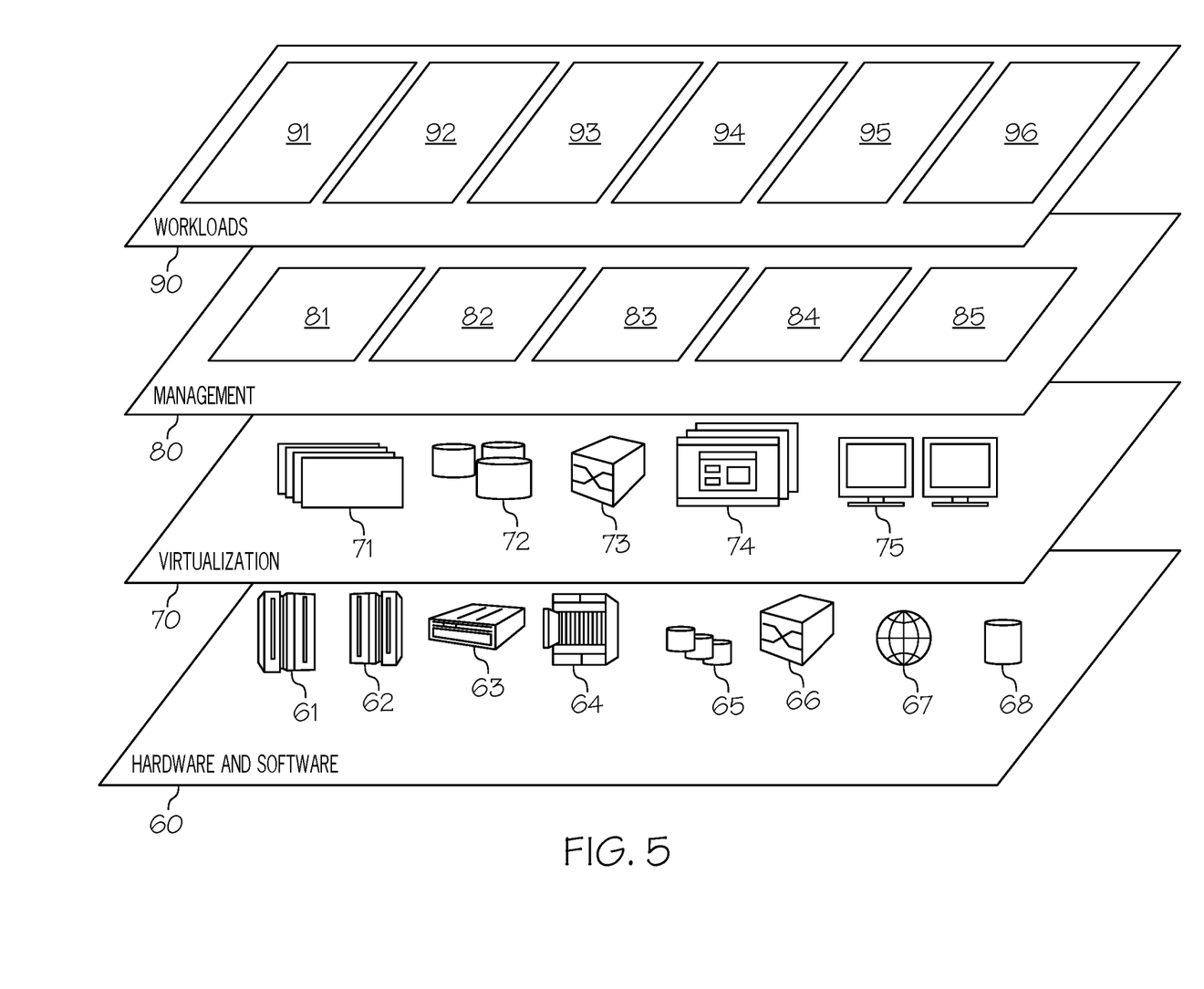
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by a server, multiple user-generated pairs of terms, wherein each of the multiple user-generated pairs of terms comprises a first term and a second term;
   identifying, by the server, instances of the multiple user-generated pairs of terms as corpus terms in an original corpus of documents, wherein the corpus terms in the original corpus of documents are labeled with labels that describe the corpus terms without identifying a relationship between two or more of the corpus terms;
   extracting, by the server, passages, from the original corpus of documents, that contain one or more of the multiple user-generated pairs of terms;
   combining, by the server, the passages into a training corpus;
   training, by the server, a word vector generating process using the training corpus, wherein the word vector generating process generates a numerical vector for each term from the training corpus, wherein the server is a multi-processor computer that comprises a first processor that receives the multiple user-generated pairs of terms, a second processor that extracts the passages from the original corpus of documents that contain one or more of the multiple user-generated pairs of terms, and a third processor that trains the word vector generating process;
   determining, by the server, a vector difference between a first vector for the first term and a second vector for the second term;
   establishing, by the server, a relationship between the first term and the second term based on the vector difference between the first vector and the second vector;
   receiving, by the server, a request from a client computer for a document from a search corpus having a third term that has a same relationship to a fourth term as the relationship between the first term and the second term;
   reiteratively subtracting, by the server, one word vector from another word vector in the search corpus until a vector difference between two word vectors is within a predefined distance of the vector difference between the first vector and the second vector;
   transmitting, from the server to the client computer, the document from the search corpus that contains two word vectors whose vector difference is within the predefined distance;
   storing, in a first cache in the first processor, only the multiple user-generated pairs of terms;
   storing, in a second cache in the second processor, only the passages from the original corpus of documents that contain one or more of the multiple user-generated pairs of terms; and
   storing, in a third cache in the third processor, only a first vector for the first term and a second vector for the second term for use in training the word vector generating process, wherein specifying what is only stored in the first cache, the second cache, and the third cache increases processing speed in the server.

2. The method of claim 1, wherein the search corpus is the original corpus of documents.

3. The method of claim 1, wherein the search corpus is the training corpus.

4. The method of claim 1, wherein the search corpus is a group of documents that includes news releases, sales brochures, and academic papers that are not part of the original corpus of documents.

5. The method of claim 1, wherein the search corpus is a group of documents that includes news releases, sales brochures, and academic papers that are not part of the training corpus.

6. The method of claim 1, wherein the server and the client computer are connected by a network, and wherein the method further comprises:
   reducing bandwidth consumed by the network by transmitting, from the server to the client computer, only documents that contain term pairs whose vector differences are within the predefined distance of the vector difference between the first vector and the second vector.

7. A computer program product comprising a non-transitory computer readable storage device having program instructions embodied therewith, the program instructions readable and executable by a computer to perform a method comprising:
   receiving, by a server, multiple user-generated pairs of terms, wherein each of the multiple user-generated pairs of terms comprises a first term and a second term;
   identifying, by the server, instances of the multiple user-generated pairs of terms as corpus terms in an original corpus of documents, wherein the corpus terms in the original corpus of documents are labeled with labels that describe the corpus terms without identifying a relationship between two or more of the corpus terms;
   extracting, by the server, sentences, from the original corpus of documents, that contain one or more of the multiple user-generated pairs of terms;
   combining, by the server, the sentences into a training corpus;
   training, by the server, a word vector generating process using the training corpus, wherein the word vector generating process generates a numerical vector for each term from the user-generated pairs of terms such that each first term A from the user-generated pairs of terms is assigned a version of a first numerical vector $\vec{A}$ and each second term B from the user-generated pairs of terms is assigned a version of a second numerical vector $\vec{B}$;

retrieving, by the server, a third term D from the original corpus of documents, wherein the third term D has a same label as the second term B;

generating, by the server implementing the word vector generating process, a third numerical vector $\vec{D}$ for the third term D;

determining, by the server, a search numerical vector $\vec{C'}$ based on $\vec{A} - \vec{B} + \vec{D} = \vec{C'}$;

determining, by the server and based on $\vec{A} - \vec{B} = \vec{C'} - \vec{D}$, that $\vec{C'}$ and $\vec{D}$ have a same vector relationship as $\vec{A}$ and $\vec{B}$;

in response to determining that $\vec{C'}$ and $\vec{D}$ have a same vector relationship as $\vec{A}$ and $\vec{B}$, determining, by the server, that a fourth term C and the third term D have a same relationship as a relationship between the first term A and the second term B;

receiving, by the server, a request for documents that contain terms that identify an entity that has a relationship to another term that matches the relationship between the first term A and the second term B;

comparing, by the server, previously generated term vectors for terms from a search corpus of documents to $\vec{C'}$;

identifying, by the server, the previously generated term vectors that are within a predetermined vector distance of $\vec{C'}$;

identifying, by the server, terms whose term vectors are within the predetermined vector distance of $\vec{C'}$, wherein the terms are from the search corpus;

receiving, by the server, a request from a client computer for documents from the search corpus that contain terms that describe an entity that has the relationship to another term that matches the relationship between the first term A and the second term B;

in response to receiving the request, retrieving, by the server, documents from the search corpus that contain at least one term whose assigned term vector is within the predetermined vector distance of $\vec{C'}$; and transmitting, from the server to the client computer, the documents from the search corpus that contain the at least one term whose assigned term vector is within the predetermined vector distance of $\vec{C'}$.

8. The computer program product of claim 7, wherein the search corpus is the original corpus of documents.

9. The computer program product of claim 7, wherein the search corpus is the training corpus.

10. The computer program product of claim 7, wherein the search corpus is a group of documents that includes news releases, sales brochures, and academic papers that are not part of the original corpus of documents.

11. The computer program product of claim 7, wherein the search corpus is a group of documents that includes news releases, sales brochures, and academic papers that are not part of the training corpus.

12. The computer program product of claim 7, wherein the first term is a name of a first executive in a first company, wherein the second term is a name of the first company, wherein the fourth term is a name of a second executive in a second company, and the third term is a name of the second company, and wherein the method further comprises:

retrieving, by the server, documents that include the name of the second executive based on a name of the second executive having been assigned a term vector is within the predetermined vector distance of $\vec{C'}$.

13. The computer program product of claim 7, wherein the server and the client computer are connected by a network, and wherein the method further comprises:

reducing bandwidth consumed by the network by transmitting, from the server to the client computer, only the documents that contain the term whose assigned term vector is within the predetermined vector distance of $\vec{C'}$.

14. The computer program product of claim 7, wherein the server is a multi-processor computer that comprises a first processor that receives the multiple user-generated pairs of terms, a second processor that extracts the sentences from the original corpus of documents that contain one or more of the multiple user-generated pairs of terms, and a third processor that trains the word vector generating process, wherein the method further comprises:

storing, in a first cache in the first processor, only the multiple user-generated pairs of terms;

storing, in a second cache in the second processor, only the sentences from the original corpus of documents that contain one or more of the multiple user-generated pairs of terms; and storing, in a third cache in the third processor, only $\vec{A}$ and $\vec{B}$ for use in training the word vector generating process, wherein specifying what is only stored in the first cache, the second cache, and the third cache increase processing speed in the server.

15. The computer program product of claim 7, wherein the program instructions are provided as a service in a cloud environment.

16. A computer system comprising one or more processors, one or more computer readable memories, one or more computer readable storage mediums, and program instructions stored on at least one of the one or more computer readable storage mediums for execution by at least one of the one or more processors via at least one of the one or more computer readable memories, the stored program instructions comprising:

program instructions to receive multiple user-generated pairs of terms, wherein each of the multiple user-generated pairs of terms comprises a first term and a second term;

program instructions to identify instances of the multiple user-generated pairs of terms as corpus terms in an original corpus of documents, wherein the corpus terms in the original corpus of documents are labeled with labels that describe the corpus terms without identifying a relationship between two or more of the corpus terms;

program instructions to extract sentences, from the original corpus of documents, that contain one or more of the multiple user-generated pairs of terms;

program instructions to combine the sentences into a training corpus;

program instructions to train a word vector generating process using the training corpus, wherein the word vector generating process generates a numerical vector for each term from the user-generated pairs of terms such that each first term A from the user-generated pairs of terms is assigned a version of a first numerical vector $\vec{A}$ and each second term B from the user-generated pairs of terms is assigned a version of a second numerical vector $\vec{B}$;

program instructions to retrieve a third term D from the original corpus of documents, wherein the third term D has a same label as the second term B;

program instructions to generate, by implementing the word vector generating process, a third numerical vector $\vec{D}$ for the third term D;

program instructions to determine a search numerical vector $\vec{C'}$ based on $\vec{A}-\vec{B}+\vec{D}=\vec{C'}$;

program instructions to determine, based on $\vec{A}-\vec{B}=\vec{C'}-\vec{D}$, that $\vec{C'}$ and $\vec{D}$ have a same vector relationship as $\vec{A}$ and $\vec{B}$;

program instructions to, in response to determining that $\vec{C'}$ and $\vec{D}$ have a same vector relationship as $\vec{A}$ and $\vec{B}$, determine that a fourth term C and the third term D have a same relationship as a relationship between the first term A and the second term B;

program instructions to receive a request for documents that contain terms that identify an entity that has a relationship to another term that matches the relationship between the first term A and the second term B;

program instructions to compare previously generated term vectors for terms from a search corpus of documents to $\vec{C'}$;

program instructions to identify the previously generated term vectors that are within a predetermined vector distance of $\vec{C'}$;

program instructions to identify terms whose term vectors are within the predetermined vector distance of $\vec{C'}$, wherein the terms are from the search corpus;

program instructions to receive a request from a client computer for documents from the search corpus that contain terms that describe an entity that has the relationship to another term that matches the relationship between the first term A and the second term B;

program instructions to, in response to receiving the request, retrieve documents from the search corpus that contain at least one term whose assigned term vector is within the predetermined vector distance of $\vec{C'}$; and program instructions to transmit, to the client computer, the documents from the search corpus that contain the at least one term whose assigned term vector is within the predetermined vector distance of $\vec{C'}$.

17. The computer system of claim 16, wherein the computer system is a multi-processor computer that comprises a first processor that receives the multiple user-generated pairs of terms, a second processor that extracts the sentences from the original corpus of documents that contain one or more of the multiple user-generated pairs of terms, and a third processor that trains the word vector generating process, wherein the computer system further comprises:

program instructions to store, in a first cache in the first processor, only the multiple user-generated pairs of terms;

program instructions to store, in a second cache in the second processor, only the sentences from the original corpus of documents that contain one or more of the multiple user-generated pairs of terms; and program instructions to store, in a third cache in the third processor, only $\vec{A}$ and $\vec{B}$ for use in training the word vector generating process, wherein specifying what is only stored in the first cache, the second cache, and the third cache increase processing speed in the server.

18. The computer system of claim 16, wherein the computer system and the client computer are connected by a network, and wherein the computer system further comprises:

program instructions to reduce bandwidth consumed by the network by transmitting, to the client computer, only the documents that contain the term whose assigned term vector is within the predetermined vector distance of $\vec{C'}$.

19. The computer system of claim 16, wherein the program instructions are provided as a service in a cloud environment.

* * * * *